(12) United States Patent
Bolis

(10) Patent No.: US 10,345,574 B2
(45) Date of Patent: *Jul. 9, 2019

(54) OPTICAL DEVICE WITH VARIABLE APERTURE

(71) Applicant: Webster Capital LLC, Wilmington, DE (US)

(72) Inventor: Sébastien Bolis, Crolles (FR)

(73) Assignee: Webster Capital LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/910,961

(22) Filed: Mar. 2, 2018

(65) Prior Publication Data
US 2018/0188521 A1 Jul. 5, 2018

Related U.S. Application Data

(63) Continuation of application No. 15/173,405, filed on Jun. 3, 2016, now Pat. No. 9,910,263.

(51) Int. Cl.
G02B 26/02 (2006.01)
G02B 26/00 (2006.01)
(Continued)

(52) U.S. Cl.
CPC ............ *G02B 26/004* (2013.01); *G02B 3/12* (2013.01); *G02B 3/14* (2013.01); *G02B 5/005* (2013.01);
(Continued)

(58) Field of Classification Search
CPC .......... G02B 26/004; G02B 3/12; G02B 3/14; G02B 5/005; G02B 7/04; G02B 26/08;
(Continued)

(56) References Cited

U.S. PATENT DOCUMENTS 3,405,623 A 10/1968 Ford et al.
6,081,388 A 6/2000 Widl
(Continued)

OTHER PUBLICATIONS

Examination Report from Australian Application No. 2016270433, dated Mar. 19, 2018, pp. 1-3.
(Continued)

Primary Examiner — Euncha P Cherry
(74) Attorney, Agent, or Firm — Robert C. Kowert; Meyertons, Hood, Kivlin, Kowert & Goetzel, P.C.

(57) ABSTRACT

An optical device with variable aperture, including a deformable membrane having a central optical area, a support to which a peripheral anchoring area of said membrane is connected, a first cavity filled with a constant volume of a first transparent fluid in a determined range of wavelengths, said cavity being delimited at least in part by a first face of said membrane and a wall of the support. The optical device also includes at least one actuation device of a region of the membrane located between the peripheral anchoring area and the central optical area of the membrane, configured to bend said region of the membrane by application of electrical actuation voltage so as to displace some of the volume of the first fluid towards the center or towards the periphery of the first cavity, said displacement of fluid being intended to deform the central area of the membrane.

20 Claims, 12 Drawing Sheets

(51) Int. Cl.
    *G02B 3/12*     (2006.01)
    *G02F 1/00*     (2006.01)
    *G02B 3/14*     (2006.01)
    *G02B 5/00*     (2006.01)
    *G03B 9/02*     (2006.01)
    *G03B 11/00*    (2006.01)
(52) U.S. Cl.
    CPC .............. *G02F 1/00* (2013.01); *G03B 9/02* (2013.01); *G03B 11/00* (2013.01); *G03B 2205/0061* (2013.01)
(58) Field of Classification Search
    CPC .... G02B 27/646; G02B 26/0825; G02B 7/36; G02F 1/00; G03B 9/02; G03B 11/00; G03B 2205/0061; H04N 5/2354; H04N 5/238
    USPC ......................................................... 359/291
    See application file for complete search history.

(56) References Cited

U.S. PATENT DOCUMENTS

2014/0192218 A1    7/2014    Jung et al.
2015/0130996 A1    5/2015    Chang et al.

OTHER PUBLICATIONS

Search Report and Written Opinion from French Application No. 1555035, dated May 13, 2016 (English Translation and French Version), Wavelens, pp. 1-13.
International Search Report from PCT/US2016/035863, dated Oct. 19, 2016, Webster Capital LLC, pp. 1-10.

OPTICAL DEVICE WITH VARIABLE APERTURE

This application is a continuation of U.S. patent application Ser. No. 15/173,405, filed Jun. 3, 2016, now U.S. Pat. No. 9,910,263, which claims benefit of priority to French Application No. 1555035, filed on Jun. 3, 2015, which are hereby incorporated by reference herein in their entirety.

FIELD OF THE INVENTION

The present invention relates to an optical device with variable aperture, also called diaphragm, and a manufacturing method of such a device.

BACKGROUND OF THE INVENTION

A diaphragm is a mechanical element interposed on the path of a light beam in an optical system for defining the amount of light transmitted and the aperture of the system.

Such a device is especially used in high-performance imaging systems as it can ensure control functions of the light flow or regulation of the depth of field. It can also block diffracted rays in the optical system and minimize aberrations of the optical system.

The iris diaphragm, described in document US 21470 [1], is still widely used in recent and evolved optical systems. It comprises an assembly of mobile blades of variable number depending on lens size. A mechanism turns the blades and therefore regulates the aperture.

Several limitations are associated with this type of diaphragm.

First of all, this is a complex and expensive solution. The complexity of the mechanical structure (mechanism for displacement of blades) creates assembly difficulties. Also, a sufficient number of mobile blades has to be integrated to obtain a quasi-circular aperture (generally necessary for an optical system). The manufacturing cost of such a diaphragm is high and this technological solution therefore proves expensive.

Also, the power consumed by such a device is high. In effect, the force required for changing the aperture is impacted by the friction between the mobile mechanical pieces. It is therefore necessary to use powerful motors to modify the aperture.

In addition, the complex mechanical structure and the motors used provide a particularly bulky device.

Finally, wear of the mobile mechanical pieces limits the reliability of the diaphragm over time.

Taking the same approach as the iris diaphragm, novel mechanical solutions have been developed in recent years [2, 3].

Of these solutions mechanical, some are based on actuation by MEMS (micro-electromechanical systems) to optimize size and reduce consumption. Such is the case in references [2, 3] mentioned above.

However, these solutions fail to overcome all limitations of the iris diaphragm. In effect, these mechanical diaphragm technologies all have large dimensions and manufacturing complexity mainly connected with the same operating principle. Also, the majority of them do not produce a quasi-circular aperture required for optical systems. For several years now, novel non-mechanical solutions have been developed.

In particular, several fluidic solutions have been developed as an alternative to mechanical solutions. State of the art of diaphragms with variable aperture with fluidic structure is detailed in the thesis by Philipp Müller [4], a brief synthesis of which is presented herein below in reference to FIGS. 12A to 12G. Each of these figures represents the same respective device in two aperture configurations.

In the technological solution presented in FIG. 12A, the optical device 200 comprises a plurality of semi-spheres 201 made of transparent elastomer pressed against a substrate 202 made of PMMA and encapsulating an opaque liquid 203. The pressure and amount of opaque liquid located between the semi-spheres 201 and the substrate 202 are adjusted so as to more or less let light through and adjust the aperture diameter.

For this purpose, the device comprises an inlet 204 of opaque liquid coupled to a system such as a pump (not shown) external to the device 200. This device is particularly significant in creating an array of diaphragms. However, such a device is not integrated, as the system for pressurizing the opaque liquid is placed to the exterior of the device, such that this solution is bulky.

The device 300 illustrated in FIG. 12B comprises a deformable membrane 301 and a constant volume of opaque liquid 302 contained in a first cavity defined in part by the membrane 301. On the face opposite the opaque liquid 302, the membrane 301 is in contact with gas 303, for example air, contained in a second cavity. Said second cavity comprises a gas inlet 304 coupled to an external system (not illustrated) for pressurizing said gas. More or less substantial pressure is applied to the membrane 301 by the gas 303 introduced to or withdrawn from the cavity via the inlet 304. The opaque liquid 302 is pushed by the membrane 301, varying the aperture of the diaphragm. This produces the same disadvantage as for the previous solution (non-integrated solution) due to the pressurizing system being external.

The device 400 illustrated in FIG. 12C comprises an opaque liquid 401 trapped between a glass substrate 402 and a deformable membrane 403 actuated by an annular piezoelectric actuator arranged at the periphery of the membrane. Under the effect of the actuator, the opaque liquid 401 is pushed from the center of the device and the center of the membrane is pressed progressively on the substrate 402. This solution is integrated, the opaque liquid 401 being encapsulated at constant volume, without it being necessary to provide an inlet/outlet for liquid or an outer pressurizing system). However, the dimension is still considerable (of the order of 25 mm per side). A major disadvantage to this solution is the resulting mediocre optical quality. In effect, when the membrane 403 is pressed against the substrate 402, a small amount of opaque liquid can remain locally which compromises the optical quality of the ensemble. Also, the solid/solid interface between the membrane and the glass generally produces a large error on the wavefront and mediocre optical quality of the bandwidth of the diaphragm. Once the membrane 403 and the substrate 402 are in contact, adhesion between the two respective materials can complicate or even prevent reverse operation and return of the opaque liquid over all or part of this area.

The device 500 illustrated in FIG. 12D comprises a plurality of concentric micro-channels 501 and an intake 502 for opaque liquid 503. Similar to the devices of FIGS. 12A and 12B, this solution is not integrated.

The device 600 illustrated in FIG. 12E comprises an opaque liquid 601 and a liquid 602 transparent to the light beam to be transmitted, as well as two inlets (601a, 602a)/outlets (601b, 602b) for each of said liquids. This system is highly complex and achieves small aperture variations only. Also, the volume of liquid in the device is not constant and systems external to the device are necessary for operation to ensure the laminar flow of both liquids.

In the examples illustrated in FIGS. 12F and 12G, the device 700, respectively 800 comprises two liquids, one opaque and the other transparent to the light beam to be transmitted, and electrodes for adjusting the wettability of one of said liquids. The operating principle in these two cases is based on electro-wetting, a technique well known in the field of fluidics. In the case of FIG. 12F, a transparent electrode 701 made of ITO is sufficient to vary the wettability of the opaque liquid 703 (and therefore its radius of curvature) relative to a hydrophobic dielectric material 702 and to more or less open the central area of the device (the transparent liquid being designated by the marker 704). In the case of FIG. 12G, the principle is the same but the sole electrode is replaced by several interdigitated electrodes 801 to best control the form of the interface between the respectively transparent 803 and opaque 804 liquids (the hydrophobic dielectric being designated by the marker 802). In both these cases, the solution is integrated (liquids are encapsulated at constant volume, no need of inlet/outlet nor complementary outer system). The disadvantages relative to both these solutions are the significant thickness of the device (typically 2 mm) and the strong electrical power supply required (typically 100 V). This latter characteristic the makes the use and control of the device complex and impacts significantly the cost of the solution.

BRIEF DESCRIPTION OF THE INVENTION

An aim of the invention is therefore to design an optical device with variable aperture which is more compact than existing devices, which is less expensive to manufacture and which involves low power consumption.

According to the invention, an optical device with variable aperture is proposed, comprising:

a deformable membrane comprising a central optical area, a support to which a peripheral anchoring area of said membrane is connected, a first cavity filled with a constant volume of a first transparent fluid in a determined range of wavelengths, said cavity being delimited at least in part by a first face of said membrane and a wall of the support, at least one actuation device of a region of the membrane located between the peripheral anchoring area and the central optical area of the membrane, configured to bend said region of the membrane by application of electrical actuation voltage to displace some of the volume of the first fluid towards the center or towards the periphery of the first cavity, said displacement of fluid being for deforming the central area of the membrane, said optical device being characterized in that it also comprises a constant volume of opaque liquid in said determined range of wavelengths, in contact at least locally with a second face of the membrane opposite the first face and with a second transparent fluid in said determined range of wavelengths and non-miscible with said opaque liquid.

Particularly advantageously, the volume of opaque liquid is selected so that:

in a rest situation when no electrical voltage is applied to the actuation device, the opaque liquid covers at least part of the membrane to produce an aperture having a first diameter, and in an actuation situation when a non-zero electrical voltage is applied to the actuation device, with the central part of the membrane having a curvature different to the curvature at rest, the opaque liquid covers at least one part of the membrane to produce an aperture having a second diameter different from the first diameter.

The aperture of this optical device can optionally be zero, in which case the optical device completely blocks the optical field and can be similar to a shutter.

According to other advantageous characteristics of the invention, considered singly or in combination:

the device further comprises a second cavity opposite the first cavity relative to the membrane, said second cavity containing the opaque liquid and a constant volume of the second transparent fluid;

the opaque liquid and the second transparent fluid have substantially the same density;

the first and second transparent fluids have substantially the same refraction index;

the first and the second cavity have a transparent wall opposite the membrane;

the transparent wall of the first and/or of the second cavity comprises an optical filter on its face opposite the cavity;

the transparent wall of the first and/or of the second cavity comprises fixed optics on its face opposite the respective cavity;

the transparent wall of the first and/or of the second cavity comprises a device with variable focal length;

said wall can have a central aperture and said device with variable focal length comprises:

a deformable membrane closing said aperture, a peripheral area of the deformable membrane being anchored on said wall, at least one actuation device of a region of the membrane located between the peripheral anchoring area and the central area of the membrane, configured to bend said region of the membrane by application of electrical actuation voltage so as to displace some of the volume of the fluid towards the center or towards the periphery of the cavity;

the membrane comprises a stiffening structure comprising cells which delimit, in the central optical area of said membrane, at least two deformable regions;

the second transparent fluid is arranged in the second cavity in the form of a plurality of elementary volumes each arranged facing a respective cell;

the second transparent fluid is arranged in the form of a single continuous volume facing the cells;

the second transparent fluid is arranged on the wall of the second cavity opposite the deformable membrane in the form of a plurality of elementary volumes;

the actuation device is piezoelectric.

Another object relates to a manufacturing method of such an optical device with variable aperture.

Said method comprises the following steps:

providing a device with variable focal length comprising the deformable membrane, the actuation device and the first transparent liquid in the first cavity, dispensing a determined volume of the opaque liquid on the deformable membrane.

Particularly advantageously, in the event where the optical device is provided with a second cavity containing the opaque liquid and the second fluid transparent, the method comprises the following steps:

providing the optical device with variable focal length obtained by the method such as described hereinabove, providing a second substrate and dispensing the second transparent fluid on said second substrate in the form of at least one drop, adhesion of the second substrate on the optical device with variable focal length, so as to encapsulate the second transparent fluid and the opaque liquid between the second substrate and the deformable membrane.

BRIEF DESCRIPTION OF DRAWINGS

Other characteristics and advantages of the invention will emerge from the following detailed description in reference to the appended drawings, in which.

Figure 1A:
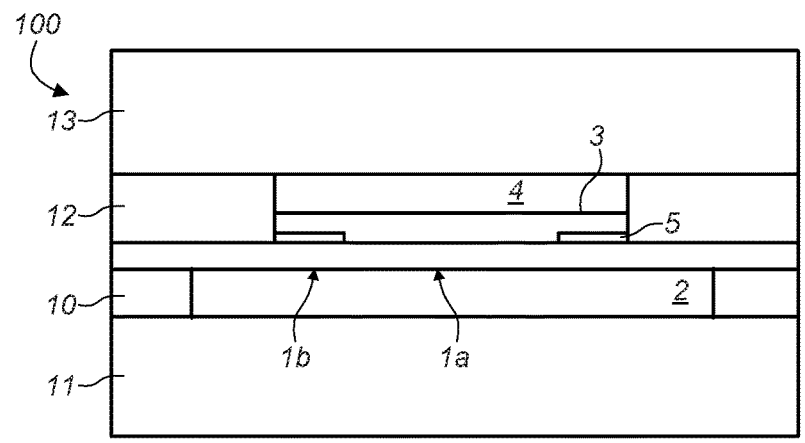
FIGS. 1A and 1B are sectional views of an optical device according to an embodiment of the invention, respectively at rest and in the actuated state.

For reasons of clarity of the figures, the different elements illustrated are not necessarily shown to the same scale.

From one figure to the other, identical reference numerals designate similar elements which are therefore not described in detail for each new figure.

DETAILED DESCRIPTION OF THE INVENTION

Figure 1B:
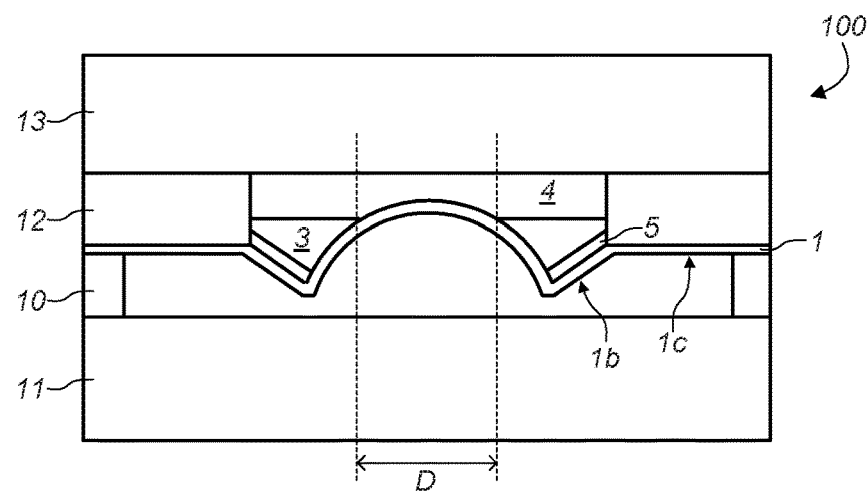

FIGS. 1A and 1B illustrate an embodiment of an optical device 100 with variable aperture according to the invention, respectively at rest (that is, in the absence of application of electrical voltage), in this case producing a zero aperture, and in the actuated state (electrical actuation voltage being applied), in this case producing an aperture having a non-zero optical diameter D.

Said device 100 comprises a deformable membrane 1 comprising a central area 1a which defines an optical field of the device and a support 10, 12 to which a peripheral anchoring area 1c of said membrane is connected.

The membrane and a wall of the support delimit at least in part a first cavity which is filled with a constant volume of a first transparent fluid 2 in a determined range of wavelengths. Said range of wavelengths typically comprises the range of wavelengths which must be transmitted through said optical device. The membrane 1 is in contact, via a first main face, with the first fluid 2. The membrane is also transparent in said range of wavelength.

Membrane means any supple and tight film such that the membrane forms a barrier to two fluids located on either side of the membrane.

The first transparent fluid 2 is sufficiently incompressible to be moved towards the central part of the first cavity when force is applied to the membrane in the direction of said fluid (and inversely, towards the periphery of the first cavity when force is applied to the membrane in a direction opposite said fluid), this force being applied in an intermediate part between the anchoring area and the central part of the membrane.

The shape of the support and of the membrane can advantageously have a shape of revolution about the optical axis of the optical device, but those skilled in the art could select any other shape without as such departing from the scope of the present invention.

On the other hand, the second main face of the membrane 1—opposite the first face—is in contact with a constant volume of opaque liquid 3 in said determined range of wavelengths. Said opaque liquid is further in contact with a second transparent fluid 4 in said determined range of wavelengths and non-miscible with said opaque liquid.

In the embodiment illustrated in FIGS. 1A and 1B, the opaque liquid 3 and the second transparent fluid 4 are contained together in a second cavity located on the other side of the first cavity relative to the membrane 1. The second transparent fluid 4 has a constant volume.

However, as will be evident in another embodiment described later (cf. FIGS. 5A-5B), the opaque liquid and the second transparent fluid are not necessarily contained in a specific cavity. It is in fact possible that the opaque liquid is kept in contact with the second main face of the membrane due to its wettability relative to the material of the membrane, and that the second transparent fluid is ambient air.

The optical device 100 also comprises at least one actuation device 5 of a region 1b of the membrane—so-called actuation region—located between the peripheral anchoring area 1c and the central optical area 1a of the membrane.

Said actuation device 5 is configured to bend said region 1b of the membrane by application of electrical actuation voltage so as to displace some of the volume of the first transparent fluid towards the center or towards the periphery of the first cavity, said displacement of fluid being intended to deform the central area of the membrane by modifying the fluid pressure exerted on said central area.

Those skilled in the art know different actuation devices may be utilized for actuating membranes.

These devices are based on different technologies, examples of which are piezoelectric actuation, electrostatic, electromagnetic, thermal actuation or even based on electroactive polymers.

In this respect reference could be made to a detailed description of such actuation devices used in optical devices with variable focal length described in documents [5]-[10].

The choice of actuation technology and sizing of the actuation device depends on expected performance levels (for example, electrical consumption), stresses to which it will be subjected during operation of the device, and considerations relative to the electrical actuation voltage to be applied.

For example, a particularly efficient actuation device is based on piezoelectric technology.

It is recalled that a piezoelectric actuator comprises a block of piezoelectric material sandwiched totally or partially between two electrodes intended, when fed, to apply an electrical field to the piezoelectric material. This electrical field is used to control mechanical deformation of the block of piezoelectric material. The block of piezoelectric material can be monolayer or multilayer and extend beyond an electrode. PZT is preferably selected as piezoelectric material.

The actuation device can comprise a single actuator in the form of a crown or else several separate actuators (for example in the form of beams) distributed uniformly over the circumference of the membrane.

Optionally, the actuators can be capable of bending in two opposite directions.

The actuation device can be arranged on the inner face of the membrane, on the outer face or even inside the membrane.

Optionally, the actuation device can extend in part over the peripheral anchoring area.

At rest (FIG. 1A), the membrane 1 is planar and the opaque liquid 3 forms a substantially uniform layer covering the second face of the membrane 1. In this situation, the opaque liquid prevents any incident radiation on the device 100 to be transmitted. In other terms, the radius of the diaphragm formed in this way is zero.

When electrical voltage is applied on actuation device (FIG. 1B), the first transparent fluid 2 deforms the center of the membrane. In effect, said fluid is pushed to the center of the first cavity by the actuation device 5, exerts pressure on the central part 1a of the membrane and changes its radius of curvature. Conversely, the opaque liquid 3 is pushed towards the periphery of the membrane 1, in the actuation region 1b.

From a certain electrical voltage (whereof the value depends on the volume of opaque liquid and geometry of the membrane), deflection of the actuation device 5 is sufficient to collect enough opaque liquid 3 to release the center of the membrane. The central deformation of the membrane combined with the flow of opaque liquid towards the periphery of the membrane progressively releases the center of the device by letting the membrane 1 make contact with the second transparent fluid 4.

The aperture of diameter D created in this way lets incident radiation through. The more accentuated the actuation (by increasing voltage applied), the larger the aperture.

Figure 2:
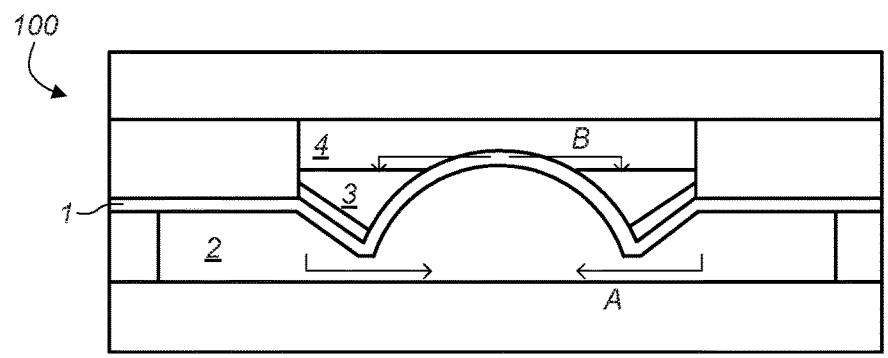
FIG. 2 is a view similar to FIG. 1B, illustrating displacements of the first transparent fluid and of the opaque liquid during actuation of the device.

As best seen in FIG. 2, which represents the same device as FIG. 1B, arrows A represent displacement of the first transparent fluid 2 in the first cavity, and arrows B represent displacement of the resulting opaque liquid 3 in the second cavity.

As compared to existing solutions, the invention has many advantages:
the solution is fully integrated, that is, with no outer element such as a pump or other and therefore has small size (from 3 to 10 mm per side, for example),
the proposed optical interface is of good quality. In fact, the solid/fluid interface between the membrane and the second transparent fluid is compatible with a satisfactory error on the wavefront,
the thickness of such a device is optimized (typically 400 µm to 700 µm),
the required actuation voltage remains low (typically 15V for a piezoelectric actuation device) and the associated power consumption can be extremely low (of the order of 0.1
the response time corresponding to this invention is fast (typically a few ms),
the manufacturing cost can be very competitive as it benefits from collective manufacturing (waferlevel type).

Figure 3A:
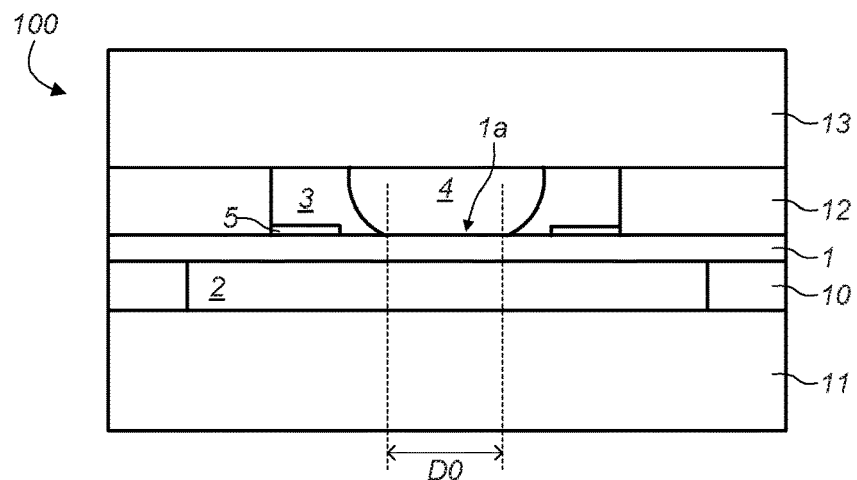
FIGS. 3A to 3C are sectional views of an optical device according to an embodiment of the invention in which the aperture has a non-zero diameter at rest, respectively at rest and in two possible actuation configurations.

In the example illustrated in FIG. 1A, the device at rest (0 V) has no optical aperture (zero diameter). However, it is quite possible for the device at rest (0 V) to have an aperture of non-zero diameter D0, as illustrated in FIG. 3A.

Figure 3B:
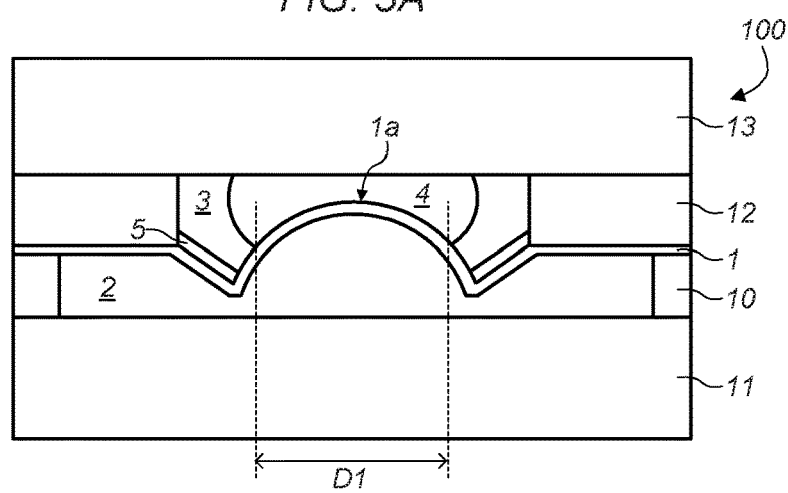
Figure 3C:
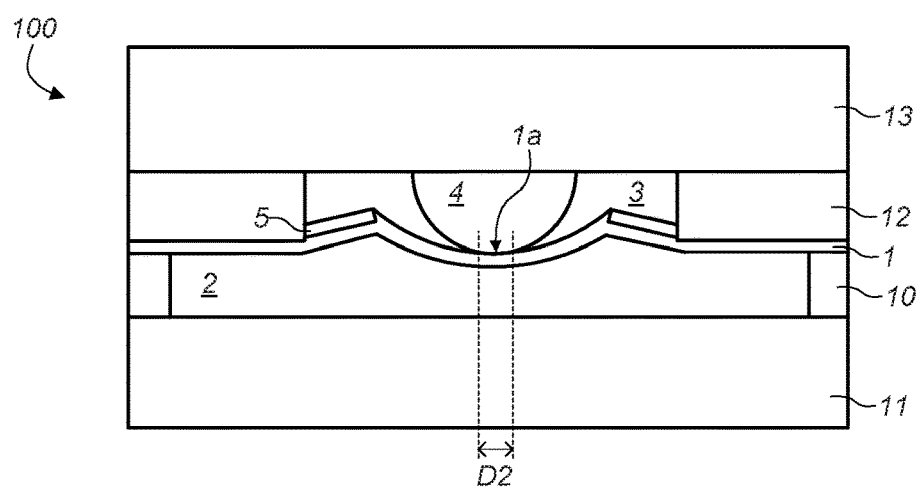

In this case, this optical aperture can be increased to a diameter D1>D0 (FIG. 3B) or decreased to a diameter D2<D0 (FIG. 3C) by applying electrical voltage to the actuation device, depending on the design of actuation and its direction of deflection.

In the example illustrated in FIGS. 1A and 2A, the first cavity is delimited by the membrane 1 and a first substrate 11 connected to the membrane by a peripheral support 10. Similarly, the second cavity is delimited by the membrane 1 and a second substrate 13 connected to the membrane 1 by a peripheral support 12. The anchoring area of the membrane is included between the peripheral supports 10 and 12.

Said first and second substrates 11, 13 are transparent in the range of wavelength in which the optical device 100 must transmit a light beam. Said substrates can be for example glass slides with parallel faces.

Advantageously, one at least of said substrates 11, 13 can also take on functions of optical filter, optical power on the device and/or variation in focal length.

Figure 4A:
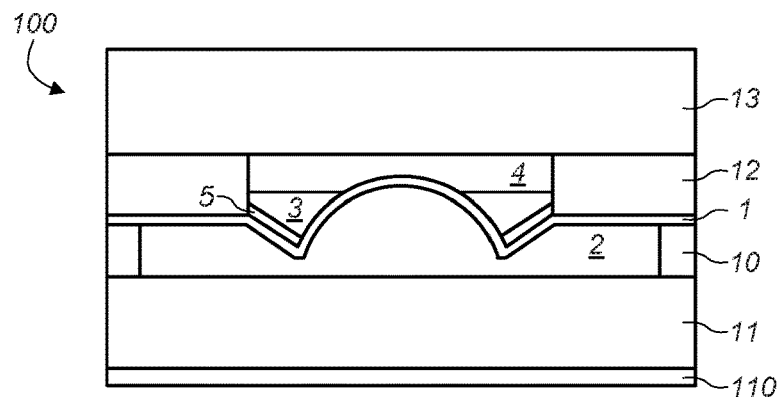
FIGS. 4A to 4C are sectional views of an optical device according to different embodiments integrating various additional functionalities.

So, in the embodiment of FIG. 4A, the first substrate 11 is provided on its face opposite the first cavity with an optical filter 110, anti-reflecting and/or infrared.

Figure 4B:
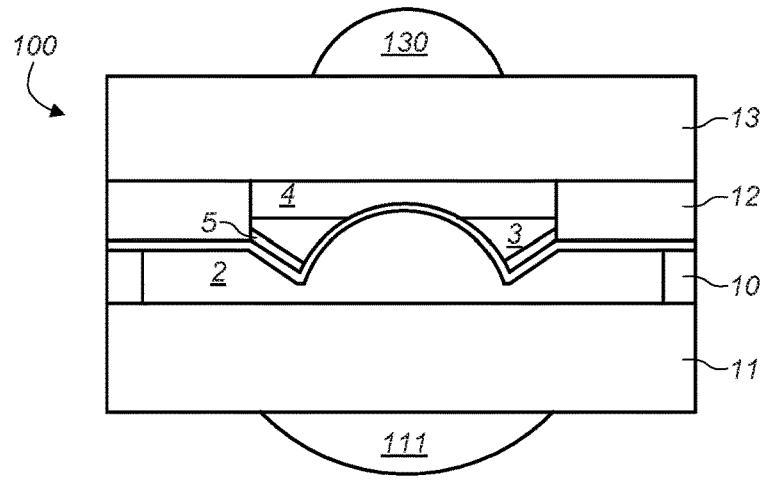

In the embodiment of FIG. 4B, the first and the second substrate 11, 13 are each provided with a respective fixed optic 111, 130 which also contributes constant optical power to the device 100.

Figure 4C:
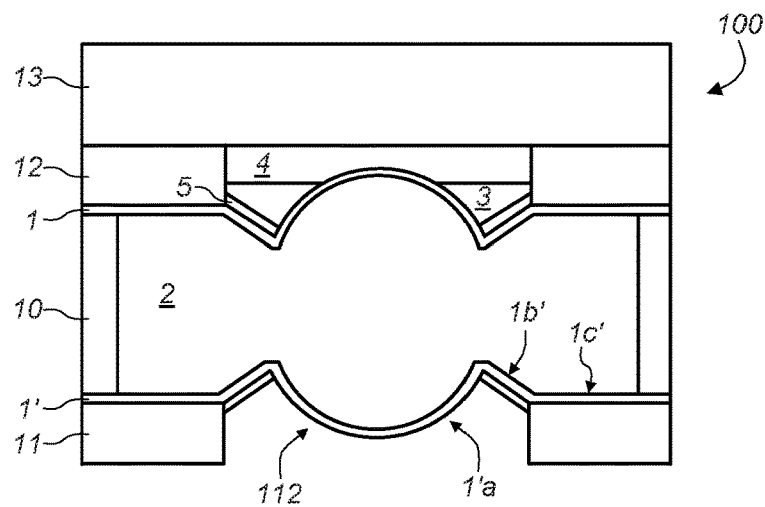

In the embodiment of FIG. 4C, the first substrate 11 has a central aperture 112 which is closed by a deformable membrane 1'. The membrane 1' is of the same type as the membrane 1 but can have different dimensions and/or mechanical properties. The peripheral area 1c' of the membrane 1' is anchored between the substrate 11 and the peripheral support 10. In addition, an actuation device 5' of the membrane 1' is arranged in an intermediate region 1b' between the central part 1a' of the membrane 1' and the peripheral anchoring area. The device 5' can be of the same type as the device 5 or be based on other actuation technology. The membrane 1' and its actuation device 5' vary the focal length of the device 100. In fact, as a function of the electrical actuation voltage applied to the device 5', some of the first transparent fluid can be pushed towards the center or towards the periphery of the first cavity, and modify the curvature of the central part 1a' of the membrane 1'.

Naturally, the functionalities present in the embodiments of FIGS. 4A-4C can be combined together or be incorporated into just one of the substrates without as such departing from the scope of the present invention.

The volume of opaque liquid and the wettability of said liquid relative to the membrane are selected to enable the operation described hereinabove, specifically a variation between:

a rest situation when no electrical voltage is applied to the actuation device, the opaque liquid covering at least one part of the membrane so as to produce an aperture having a first diameter (zero or not), and an actuation situation when a non-zero electrical voltage is applied to the actuation device, the central part of the membrane having a curvature different to the curvature at rest, the opaque liquid covering at least one part of the membrane so as to produce an aperture having a second diameter (zero or not) different to the first diameter (greater or less than the latter).

The opaque liquid is for example liquid or oil comprising pigments and/or dyes in sufficient amount to block the incident light beam. For example, the opaque liquid can be selected from the following liquids: propylene carbonate, water, an index liquid, optical oil or ionic liquid, a silicone oil, an inert liquid with considerable thermal stability and low saturating vapor pressure.

The wettability of the opaque liquid relative to the membrane can be adjusted by selecting a material adapted for the membrane and/or by applying hydrophobic or hydrophilic surface treatments to the membrane. Such treatments are known per se and therefore will not be described in detail here. Reference could be made for example to the following documents: [11] for the effect of plasma treatments; [12] for the effect of the surface state and roughness of materials; [13] for examples of materials (such as particularly hydrophobic Cytop™ and hydrophilic SiO2).

Figure 5A:
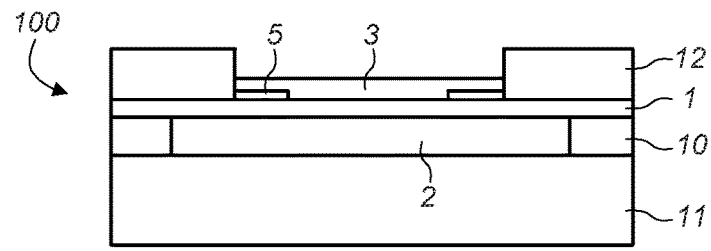
FIGS. 5A and 5B are sectional views of an optical device according to an embodiment of the invention in which the opaque liquid and the second transparent fluid are not encapsulated in a cavity, respectively at rest and in the actuated state.
Figure 5B:
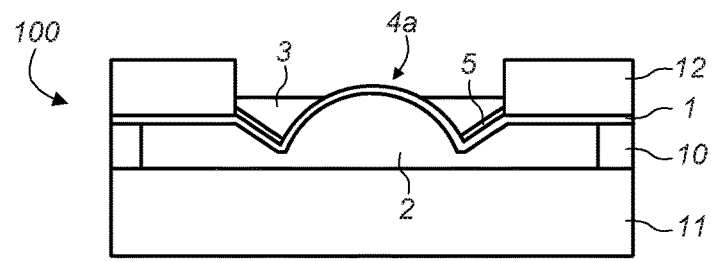

In an embodiment illustrated in FIGS. 5A and 5B, the opaque liquid is not encapsulated in a dedicated cavity and is simply in contact with ambient air, which constitutes the second transparent fluid mentioned earlier.

This embodiment can be obtained simply by depositing the opaque liquid onto the outer face of the membrane of an optical device with variable focal length.

The spreading of the opaque liquid 3 on the membrane 1 can be adjusted and controlled as a function of the deposited volume of liquid, its wettability on the membrane, surface preparation of the membrane, its structuring or again the initial deformation of the membrane.

As mentioned earlier, the configuration of the opaque liquid at rest is not necessarily a uniform layer of thickness. On the other hand, the deformable membrane is not necessarily planar in the rest situation. Finally, the position of the actuation device illustrated in the different figures is not limiting. So, the actuators can be deflected upwards or downwards at rest independently of the curvature of the central part of the membrane.

FIGS. 6A-6D illustrate non-limiting different configurations of the device 100 at rest, that is, in the absence of application of electrical actuation voltage. It should be noted that these configurations can also be found in an embodiment in which constant volumes of the opaque liquid and of the second transparent fluid are encapsulated in a cavity.

Figure 6A:
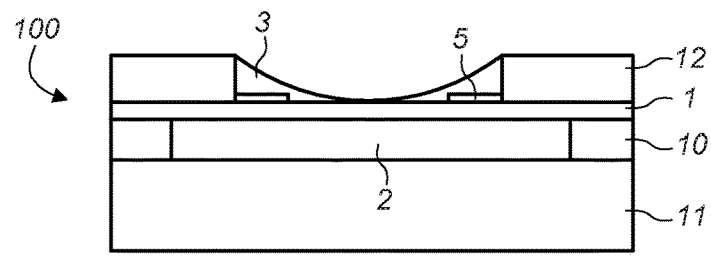
FIGS. 6A to 6D illustrate different configurations of the optical device according to the invention at rest.

In the case of FIG. 6A, the wettability of the opaque liquid relative to the membrane—which is planar in this embodiment—and of the peripheral support 12 is such that the opaque liquid 3 does not form a layer of uniform thickness but a layer of concave form whereof the thickness is greater at the center than at the periphery of the membrane. As the layer of opaque liquid 3 is continuous, the aperture of the optical device 100 is zero.

Figure 6B:
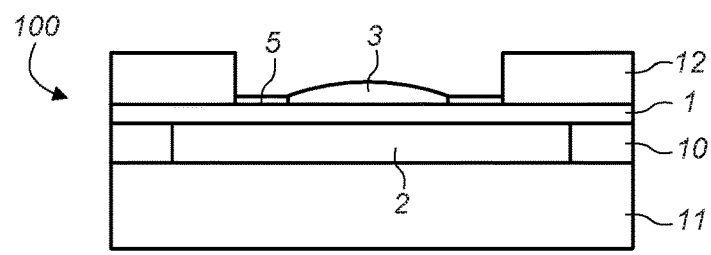

In the case of FIG. 6B, the wettability of the opaque liquid relative to the membrane—which is planar in this embodiment—and the peripheral support 12 is such that the opaque liquid 3 does not form a layer of uniform thickness but a layer of convex form whereof the thickness is greater at the periphery of the membrane than at the center. As the layer of opaque liquid 3 is continuous, the aperture of the optical device 100 is zero.

Figure 6C:
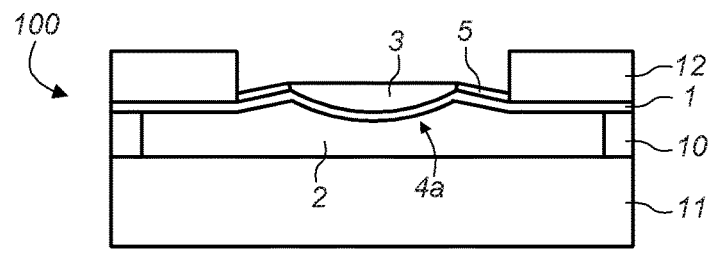

In the case of FIG. 6C, the membrane is not planar but its central part 1a has a concavity for receiving the opaque liquid 3. The surface of the opaque liquid 3 opposite the membrane is planar as such. As the layer of opaque liquid 3 is continuous, the aperture of the optical device 100 is zero.

Figure 6D:
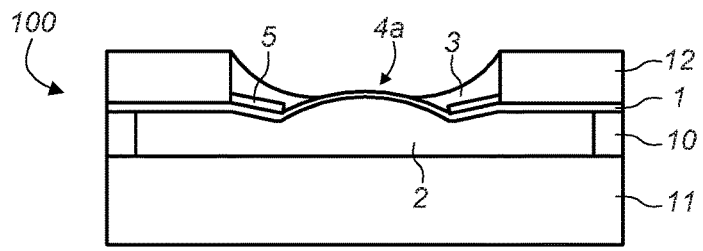

In the case of FIG. 6D, the membrane is convex in its central part 1a, such that the opaque liquid 3 extends on either side of the apex of the central part 1a. The aperture of the optical device 100 is therefore non-zero.

However, this embodiment can be sensitive to gravity. In effect, as a function of the volume of opaque liquid, the geometry of the membrane and the wettability between the opaque liquid and the deformable membrane, such an embodiment can create a device having different optical performance depending on its orientation.

To avoid this problem and limit the effects of gravity on electro-optical performance of the device, transparent fluid of the same density as the opaque liquid can advantageously be utilized.

In addition, the embodiment of FIGS. 5A and 5B is likely to also have another disadvantage. In effect, the potential difference in refraction index between the first transparent fluid and the ambient air generates a variation in focal length of the device coupled with the variation in optical aperture.

To prevent such an effect, the first and second transparent fluids can be selected to have identical refraction indices (for example using the same gas or same liquid). This also avoids deviating from the variation in focal length due to deformation of the membrane between the rest state and actuation state (cf. FIGS. 1A and 1B for example), if the variation in focal length is not intended and the aim is only to vary the aperture.

To simultaneously optimize transmission of the assembly, a transparent fluid or fluids having a similar refraction index or even near the membrane and the substrate or substrates can be selected.

For these reasons, a preferred embodiment of the invention relates to an optical device in which the second transparent fluid is encapsulated at constant volume in a second cavity with the opaque liquid. So, the second transparent fluid (advantageously identical to first transparent fluid) can be selected and the behavior of opaque liquid under the effect of gravity can be best controlled.

To form such a cavity, a second substrate such as shown in FIGS. 1A to 4C is advantageously used.

At rest (zero actuation voltage), the rest position of the membrane and the respective volumes of opaque liquid and second fluid and their position in the optical device determine an initial aperture of the device.

To make variation in aperture easier and adapt the accessible range of aperture, different configurations are possible in addition to the configurations illustrated in FIGS. 6A-6D described above.

Figure 7A:
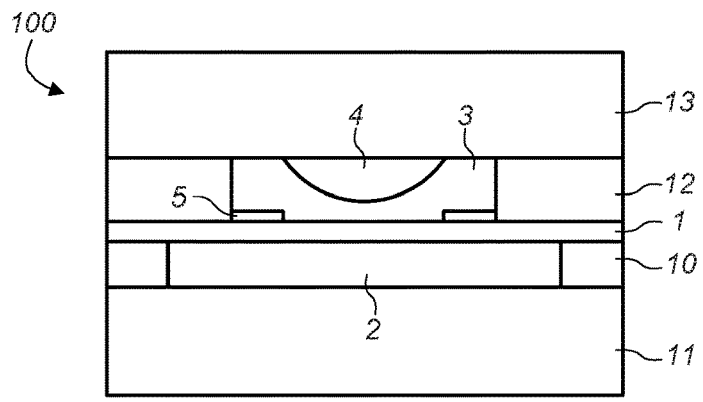
FIGS. 7A and 7B are sectional views of an optical device at rest according to two embodiments of the invention in which the wettability of the second transparent fluid relative to the wall of the second cavity is different.
Figure 7B:
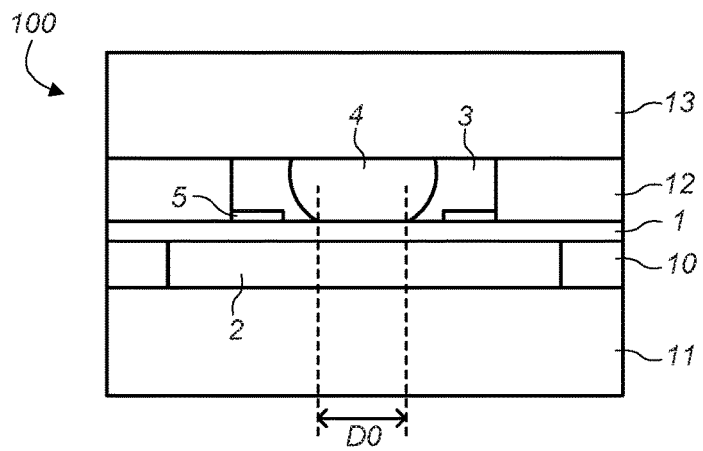

FIGS. 7A and 7B illustrate two embodiments of an optical device 100 at rest (actuation voltage zero). In both cases, the membrane 1 is planar at rest. In the case of FIG. 7A, the second transparent fluid 4 has greater wettability relative to of the second substrate 13 than in the case of FIG. 7B. This induces a smaller contact angle between the volume of second transparent fluid and the surface of the second substrate. The result of this, in the case of FIG. 7A, is a zero aperture of the optical device 100, while the aperture has a non-zero diameter D0 in the case of FIG. 7B.

The second substrate 13 can be functionalized to determine the spread of the second transparent fluid on contact. In terms of functionalizing, any localized surface treatment intended to adjust the wettability of the second fluid on the second substrate can especially be cited. The local contribution of hydrophilic/hydrophobic material on the second substrate can also be envisaged.

A third embodiment forms a network of diaphragms with variable aperture.

Figure 8A:
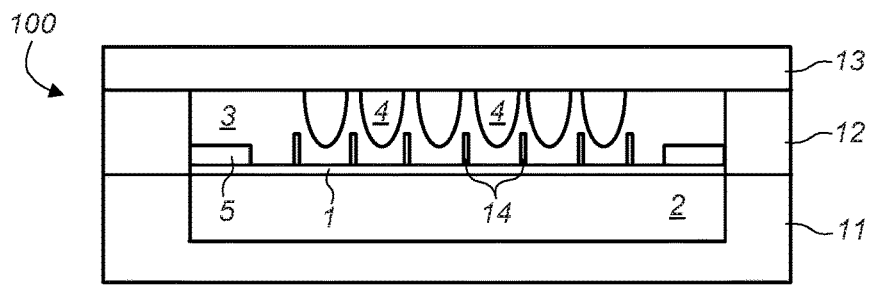
FIGS. 8A and 8B are sectional views of an optical device comprising a network of diaphragms according to an embodiment of the invention in which the membrane comprises a stiffening structure and the second transparent fluid is arranged in the form of a network of droplets, respectively at rest and in the actuated state.
Figure 8B:
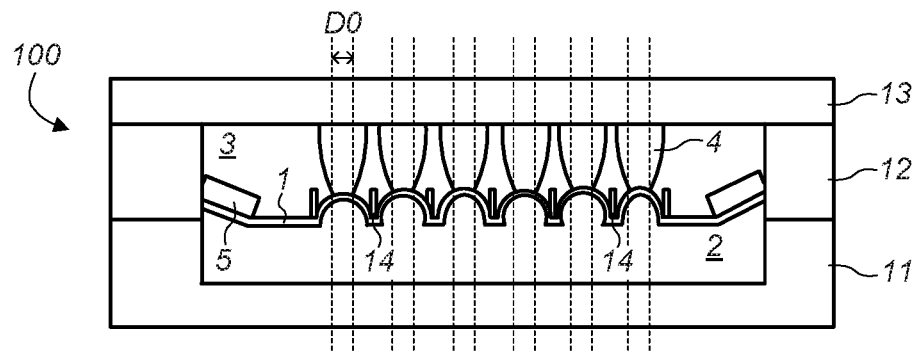

For this purpose, as illustrated in FIGS. 8A-8B, the membrane 1 comprises a stiffening structure 14 which delimits, in the central part of the membrane, at least two elementary deformable regions and which defines the mechanical behavior of the membrane (especially its stiffness) in the regions of the central part of the membrane extending between said elementary deformable regions.

According to an embodiment, the stiffening structure can comprise a plurality of grooves which extend perpendicularly to the surface of the membrane.

Alternatively, the stiffening structure can comprise a layer extending over the central part of the membrane and having apertures delimiting at least two deformable regions of the membrane.

The use of a stiffening structure in the form of grooves is particularly preferred for making a large number of elementary deformable regions in the central part of the membrane. The small thickness of the grooves in fact maximizes the number of separate deformable regions in the central part of the membrane.

Conversely, the use of a stiffening structure in the form of a layer having openings is preferred for making a small number of elementary deformable regions.

Advantageously, the stiffening structure is arranged so as to form cells, the portion of membrane located inside each cell being deformable.

Each portion of membrane located inside a cell is capable of deforming reversibly, from a rest position (which can be planar or not), under the action of displacement of the first transparent fluid, which varies the fluid thickness at the level of the central part of each membrane. Said portions of membrane can have identical stiffness from one region of the membrane to the other or by contrast have different stiffness, said stiffness being especially able to be adjusted by a local change in thickness or material of the membrane.

The opaque liquid is in contact with the deformable membrane, for example to the side of the stiffening structure 14.

The second transparent fluid 4 (which in this case is a liquid) is placed on the second substrate 13 prior to assembly of the device 100 in the form of a network of droplets facing the network of cells of the deformable membrane. This arrangement in droplets is achieved by locally adjusting the wettability of the second transparent fluid relative to the second substrate.

A network of elementary optical devices with variable aperture is formed in each cell. At rest (FIG. 8A), the opaque liquid 3 covers the entire surface of each cell. Each elementary optical device has a zero aperture.

With application of electrical actuation voltage (FIG. 8B), each elementary deformable region of the membrane deforms following displacement of the first transparent fluid 2 by the actuation device 5. The result is that the opaque liquid is pushed towards the periphery of each cell, accordingly placing the membrane in contact with the second transparent fluid and producing a non-zero aperture of diameter D0.

In the example illustrated in FIG. 8B, the aperture diameter D0 is identical for all elementary diaphragms of the network during actuation. However, adjusting the volume and/or the shape of the network of droplets of the second transparent fluid can produce different aperture diameters on the network of diaphragms during actuation.

According to another embodiment illustrated in FIGS. 8A-8B, the network of diaphragms can be obtained without having the second transparent fluid in the form of a network. Integrating the second fluid in one amount can also create a network of diaphragms.

Figure 9A:
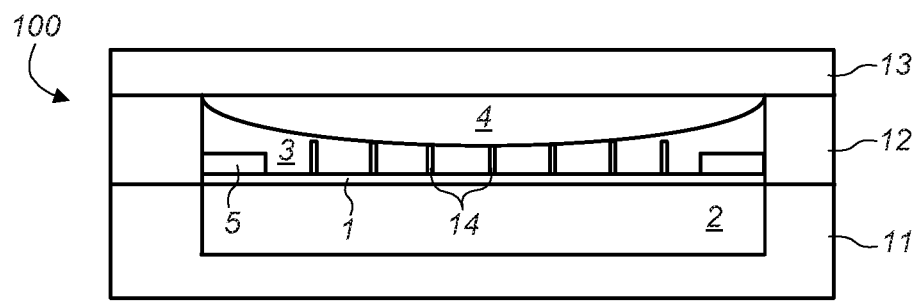
FIGS. 9A and 9B are sectional views of an optical device comprising a network of diaphragms according to an embodiment of the invention in which the membrane comprises a stiffening structure and the second transparent fluid is arranged in the form of a single continuous volume, respectively at rest and in the actuated state.

As evident in FIG. 9A, which shows the optical device 100 at rest, the second transparent fluid 4 is in the form of a continuous layer covering the surface of the second substrate 13. The opaque liquid 3 covers the surface of the membrane in all the cells defined by the stiffening structure 14.

With application of electrical actuation voltage (FIG. 9B), each elementary deformable region of the membrane deforms following displacement of the first transparent fluid 2 by the actuation device 5. The result is that the opaque liquid is pushed towards the periphery of each cell, accordingly placing the membrane in contact with the second transparent fluid and producing a non-zero aperture at least in some cells.

Figure 9B:
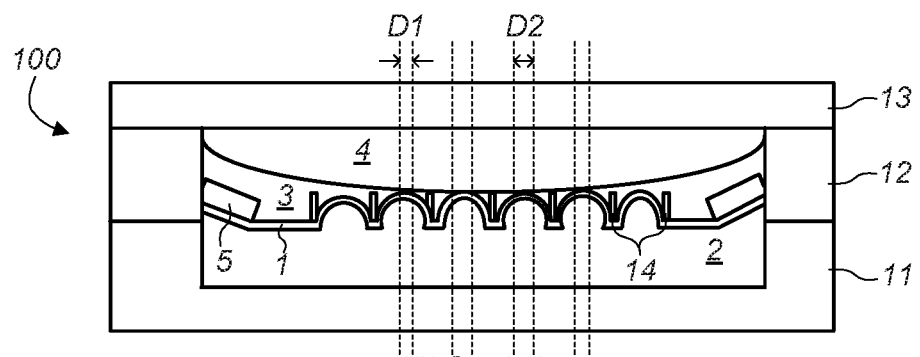

In the example illustrated in FIG. 9B, the aperture diameter of the network of diaphragms is not identical from one cell to the other. So, an aperture having a diameter D2 is obtained in the cells located closest to the center of the membrane, a diameter D1 less than D2 is obtained in the cells enclosing said central cells, and no aperture is created in the cells located at the periphery of the network. However, adjusting the volume or form of the spread of the second transparent fluid can create the same aperture diameter on the network of diaphragms during actuation.

Another solution to create a network of diaphragms having different diameters in an actuation situation consists of using an optical device 100 devoid of the stiffening structure 14 and arranging the second transparent fluid 4 according to a network of droplets.

Figure 10A:
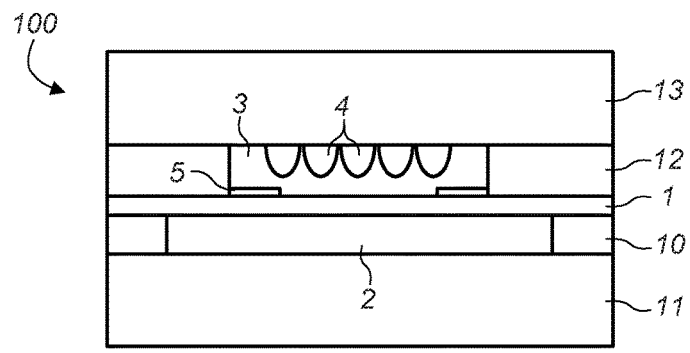
FIGS. 10A and 10B are sectional views of an optical device comprising a network of diaphragms according to an embodiment of the invention in which the second transparent fluid is arranged in the form of a network of droplets, respectively at rest and in the actuated state.
Figure 10B:
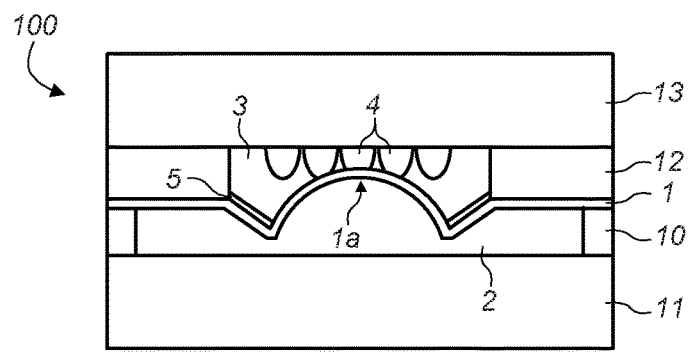

FIGS. 10A and 10B illustrate such a device 100 respectively at rest and in the actuated state.

At rest, the membrane 1 is planar and the opaque liquid covers the entire surface of the membrane 1. The optical device therefore has a zero aperture.

Under the effect of electrical actuation voltage, the central part 1a of the membrane deforms and makes contact with at least the droplets of second transparent fluid 4 located at the center of the second substrate 13. In this case, the elementary optical devices have an aperture of non-zero diameter, the diameter being all the greater since the elementary optical device is near the center of the device 100. However, for elementary optical devices located at the periphery, the membrane 1 remains in contact with the opaque liquid 3, such that said devices have a zero aperture.

The optical device such as described hereinabove can be made by means of micromanufacturing techniques.

In particular, the manufacturing method can comprise the following steps.

Figure 11A:
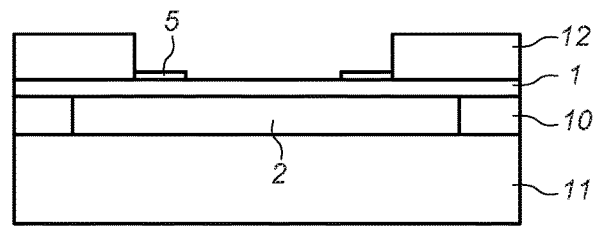
FIGS. 11A to 11E illustrate different steps of the manufacturing of an optical device with variable aperture according to an embodiment of the invention.

In reference to FIG. 11A, a device is provided with variable focal length comprising the deformable membrane 1 anchored between the peripheral supports 10, 12, the actuation device 5 and the first transparent liquid 2 encapsulated between the membrane 1, the peripheral support 10 and the first substrate 11. The manufacturing of such a device is known per se, especially from documents [5]-[10].

Figure 11B:
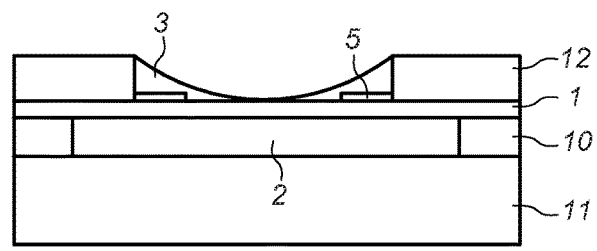

Next, in reference to FIG. 11B, a determined volume of the opaque liquid 3 is dispensed on the deformable membrane 1. Previous surface treatment can be carried out if necessary to optimize the wettability of the opaque liquid on the deformable membrane.

Figure 11C:
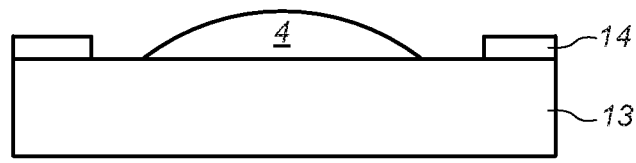

In reference to FIG. 11C, the second substrate 13 is provided on which a peripheral adhesive bead 14 is deposited, for example by serigraphy, and the second transparent fluid 4 (here liquid) is dispensed on the second substrate in the form of a single drop (case of FIG. 11C) or a network of drops (not illustrated) according to the embodiment in question. Said substrate can have undergone surface treatment adapted to adjust the wettability of the second transparent fluid.

Figure 11D:
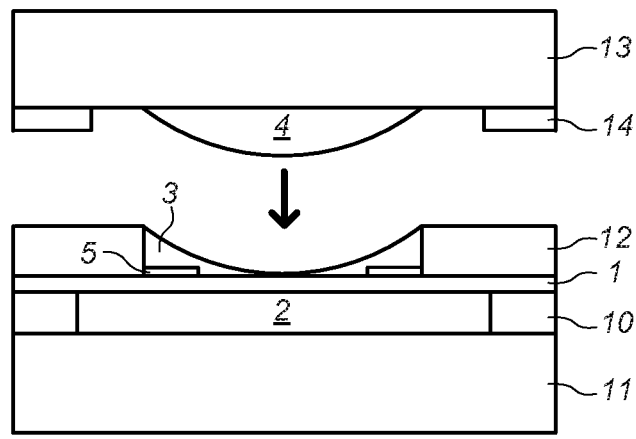

Next, in reference to FIG. 11D, the second substrate 13 is stuck on to the device with variable focal length by means of the bead 14 of FIG. 11B so as to encapsulate the opaque liquid 3 and the second transparent fluid 4. The encapsulation method used is well known in the prior art, especially methods used to encapsulate liquid crystals in LCD screens. The method described in FIG. 11D is known under the name of "One Drop Filling" (adhesion on liquid). In the event where the second transparent fluid is gas, a classic adhesion method is used. Said adhesion can be non-hermetic if said fluid is air (air can freely enter or leave the second cavity). In the event where the second transparent fluid is different to ambient air, said adhesion must however be hermetic.

As the second transparent fluid 4 and the opaque liquid 3 are non-miscible, they form two separate entities in the resulting cavity.

Figure 11E:
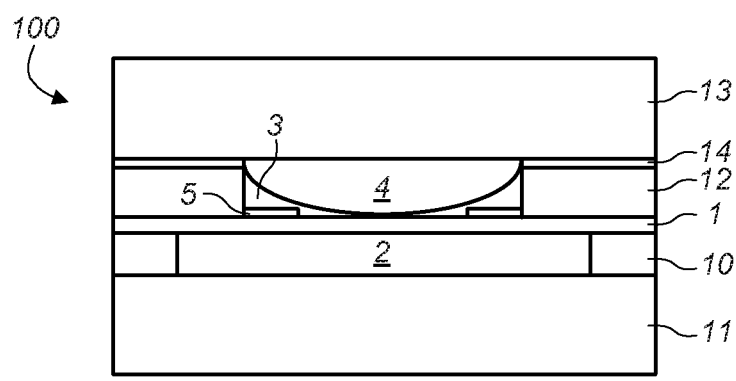
Figure 12A:
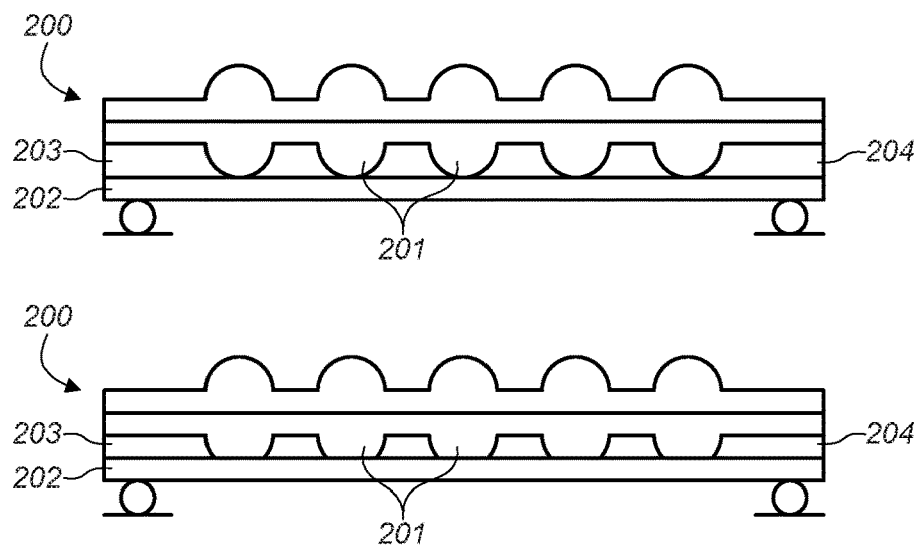
FIGS. 12A to 12G illustrate optical devices with variable aperture belonging to the prior art.
Figure 12B:
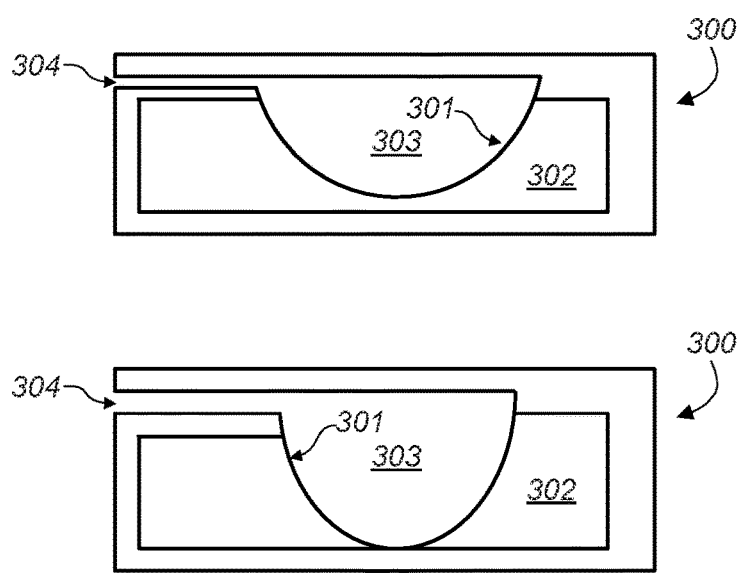
Figure 12C:
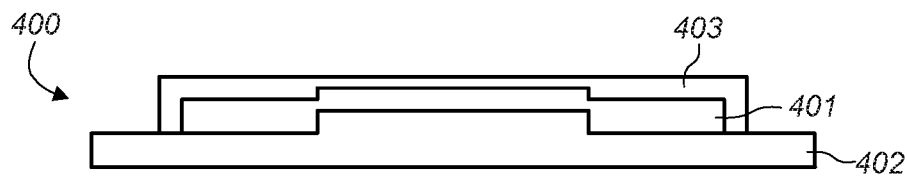
Figure 12C:
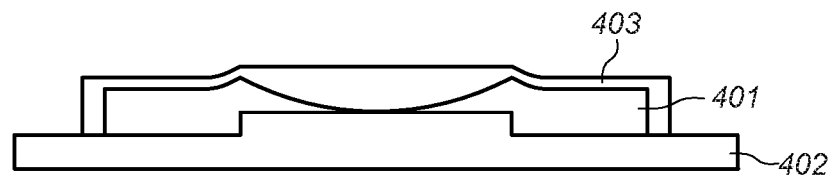
Figure 12D:
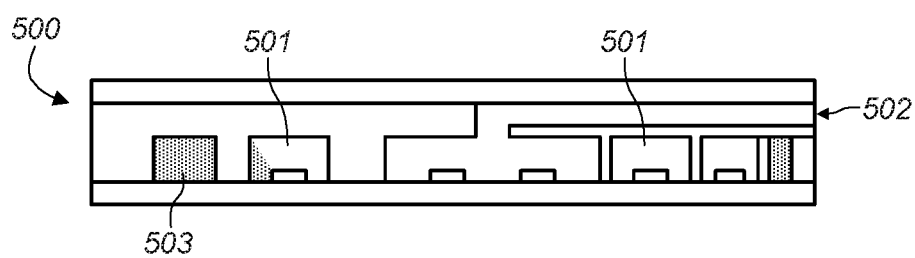
Figure 12D:
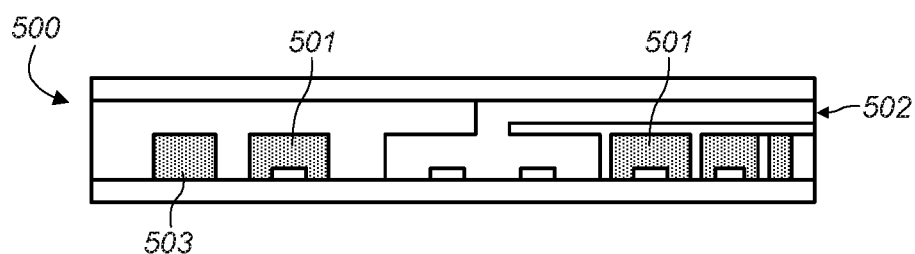
Figure 12E:
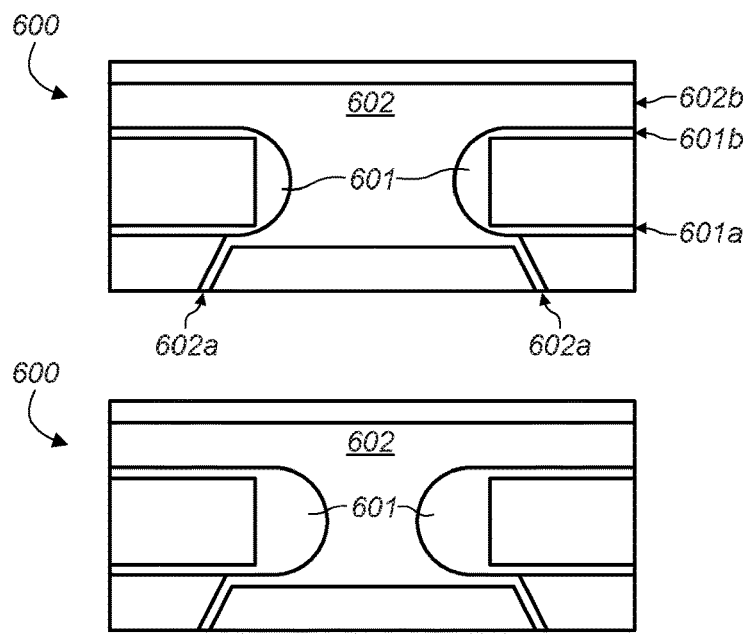
Figure 12F:
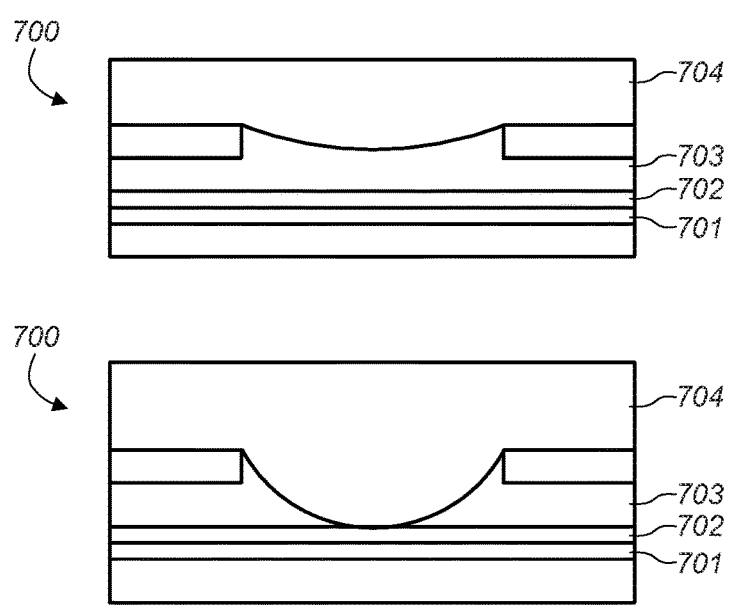
Figure 12G:
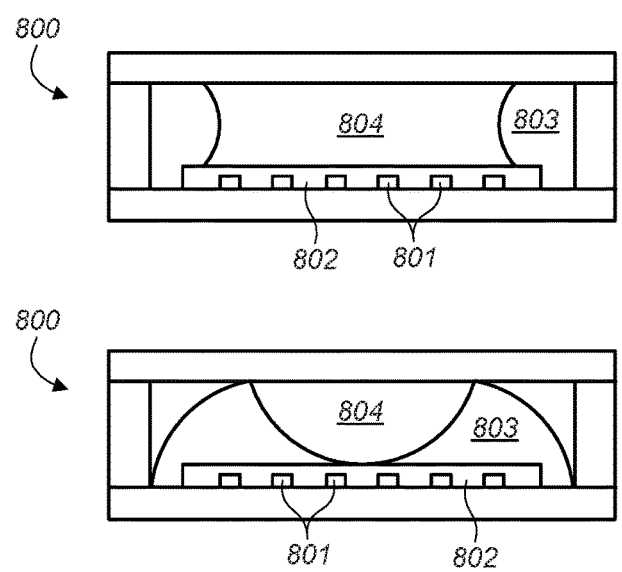

The optical device 100 illustrated in FIG. 11E is the result.

The invention therefore provides an optical device with compact variable aperture, of low power consumption and easy to manufacture by means of collective microsystems methods.

In this respect, such a device is particularly adapted to miniature cameras for mobile telephony.

Other advantageous applications relate to the industry, the medical field, automobile field, security and defense.

The present invention can also apply in the field of lighting or even display.

REFERENCES

[1] US21470
[2] "Sliding-blade MEMS iris and variable optical attenuator", Journal of Micromechanics and Microengineering, 14:1700-1710, 2004
[3] US 2015/037024
[4] Thesis by Philipp Müllner, "Tunable optofluidic apertures", Research in Micro-optics, Volume 11, edited by Prof. Dr. Hans Zappe, Department of Microsystems Engineering—IMTEK, University of Freiburg, 2012, paragraph 1.2
[5] FR 2919073
[6] FR 2919074
[7] FR 2930352
[8] FR 2938349
[9] FR 2950153
[10] FR 2950154
[11] "Wettability Tests of Polymer Films and Fabrics and Determination of Their Surface Energy by Contact-Angle Methods", Daphne Pappas, Craig Copeland, Robert Jensen, ARL-TR-4052, March 2007
[12] "Wettability Switching Techniques on Superhydrophobic Surfaces", Nanoscale Res Lett (2007) 2:577-596
[13] "Electrowetting: from basics to applications", J. Phys.: Condens. Matter 17 (2005) R705-R774

What is claimed is:

1. An optical device, comprising:
a deformable membrane comprising a central optical area;
a support to which a peripheral anchoring area of said deformable membrane is connected;
a first cavity filled with a first transparent fluid, said cavity being delimited at least in part by a first face of said deformable membrane and a wall of the support;
at least one actuation device configured to bend a region of the deformable membrane to displace some of a volume of the first transparent fluid to deform the central area of the deformable membrane; and
an opaque liquid in contact at least locally with a second face of the deformable membrane opposite the first face and with a second transparent fluid non-miscible with said opaque liquid, wherein the opaque liquid is opaque in a range of wavelengths;
wherein at different actuation states of the at least one actuation device the opaque liquid covers different amounts of the deformable membrane to produce differently sized apertures.

2. The optical device of claim 1, wherein the opaque liquid has a volume so that:
in a rest state, the opaque liquid covers at least one part of the deformable membrane to produce an aperture having a first diameter, and
in an actuation state, the central part of the deformable membrane having a curvature different to the curvature at rest, the opaque liquid covers at least one part of the deformable membrane to produce an aperture having a second diameter different from the first diameter.

3. The optical device of claim 1, further comprising a second cavity opposite the first cavity relative to the deformable membrane, said second cavity containing the opaque liquid and the second transparent fluid.

4. The optical device of claim 3, wherein the opaque liquid and the second transparent fluid have substantially the same density.

5. The optical device of claim 3, wherein the first and second transparent fluids have substantially the same refraction index.

6. The optical device of claim 3, wherein the first and second cavity have a transparent wall opposite the deformable membrane.

7. The optical device of claim 6, wherein the transparent wall of the first cavity or of the second cavity comprises an optical filter on its face opposite the cavity.

8. The optical device of claim 6, wherein the transparent wall of the first cavity or of the second cavity comprises a fixed optic on its face opposite the respective cavity.

9. The optical device of claim 6, wherein the transparent wall of the first cavity or of the second cavity comprises a device with variable focal length.

10. The optical device of claim 3, wherein the deformable membrane comprises a stiffening structure comprising cells which delimit, in the central optical area of said deformable membrane, at least two deformable regions.

11. The optical device of claim 10, wherein the second transparent fluid is arranged in the second cavity in the form of a plurality of elementary volumes each arranged facing a respective cell.

12. The optical device of claim 10, wherein the second transparent fluid is arranged in the form of a single continuous volume facing the cells.

13. The optical device of claim 3, wherein the wettability of the opaque liquid and first and second transparent fluids is adjustable.

14. The optical device of claim 1, wherein one of the differently sized apertures is completely closed.

15. The optical device of claim 1, wherein the at least one actuation device is a piezoelectric-based actuation device.

16. A mobile device, comprising:
   an optical device comprising a deformable membrane, an actuation device, and a first transparent fluid in a first cavity;
   an opaque liquid on the deformable membrane;
   a second substrate and a second transparent fluid on said second substrate; and
   wherein the second substrate encapsulates the second transparent fluid and the opaque liquid between the second substrate and the deformable membrane.

17. The mobile device of claim 16, wherein the opaque liquid is opaque in a range of wavelengths.

18. The mobile device of claim 16, wherein the opaque liquid has a volume so that:
   in a rest state, the opaque liquid covers at least one part of the deformable membrane to produce an aperture having a first diameter, and
   in an actuation state, the central part of the deformable membrane having a curvature different to the curvature at rest, the opaque liquid covers at least one part of the deformable membrane to produce an aperture having a second diameter different from the first diameter.

19. The mobile device of claim 16, wherein the actuation device is a piezoelectric-based actuation device.

20. The mobile device of claim 16, wherein the first transparent fluid and the second transparent fluid have substantially the same refraction index.

* * * * *